Feb. 12, 1935.  L. D. MILLS ET AL  1,990,559
CYANIDE PROCESS AND APPARATUS
Filed Oct. 21, 1932
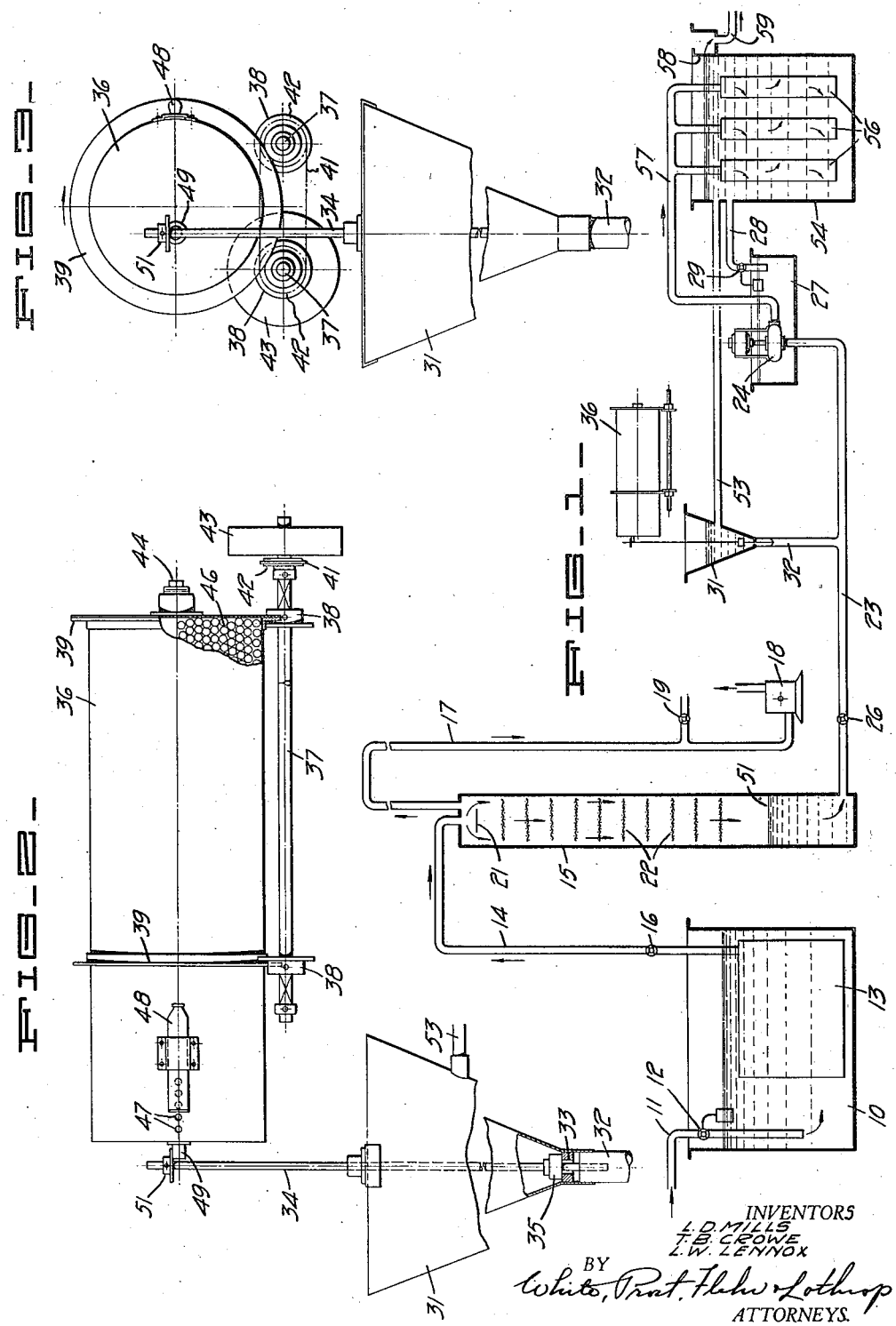
INVENTORS
L. D. MILLS
T. B. CROWE
L. W. LENNOX
BY
ATTORNEYS.

Patented Feb. 12, 1935

1,990,559

UNITED STATES PATENT OFFICE 1,990,559

CYANIDE PROCESS AND APPARATUS

Louis D. Mills, Thomas B. Crowe, and Luther W. Lennox, Palo Alto, Calif., assignors to The Merrill Company, San Francisco, Calif., a corporation of California Application October 21, 1932, Serial No. 638,924

12 Claims. (Cl. 75—185)

This invention relates generally to a process and apparatus for clarifying, deaerating and precipitating hydro metallurgical solutions, particularly cyanide solutions containing gold and silver. The term "cyanide solution" is used herein to designate aqueous solutions of cyanide and lime which are employed to dissolve gold and silver from their ores.

It is a general object of the invention to provide a process and apparatus of the above character which will continuously clarify, deaerate and precipitate cyanide solutions without exposure to the atmosphere, either during or between individual steps of clarifying, deaerating and precipitating.

A further object of the invention is to materially simplify apparatus of the above character, particularly with respect to provision for causing flow of the solution thru the successive treatment stages. In this connection the invention is characterized by the use of a single pump for causing continuous flow of the solution thru the successive stages of clarification, deaeration and precipitation.

A further object of the invention is to provide automatic regulation of the level of the solution within the deaerating receiver, without the use of floats and valves such as have been utilized in the past.

A further object of the invention is to provide improved means for introducing a precipitant (such as a finely divided metallic zinc, commonly termed "zinc dust") into the solution, whereby a filter of minimum capacity for removing the precipitate can be employed, and whereby certain parts will not be subject to clogging.

A still further object of the invention is to prevent reabsorption of oxygen into the barren cyanide solution, which is used to introduce the zinc dust precipitant into the clarified, deaerated solution containing the metals to be precipitated.

Further objects of the invention will appear from the following description in which the preferred embodiment of the invention has been set forth in detail in conjunction with the accompanying drawing.

Referring to the drawing:

Figure 1 is a diagrammatic view, illustrating apparatus incorporating the present invention and which can be utilized in our process.

Fig. 2 is a detail illustrating diagrammatically certain parts of the feed mechanism for the zinc dust.

Fig. 3 is a plan view of Fig. 2 on larger scale.

Heretofore, in clarifying cyanide solutions prior to precipitation of gold and silver with zinc dust, it has been common to employ separate clarification units, the clarified solution being subsequently stored in tanks of substantial size, wherein the solution is exposed to the atmosphere for a substantial period of time before passing to the next step of the precipitation process. When alkaline cyanide solutions are thus exposed to the atmosphere, particularly in open sunlight, a precipitate frequently forms in the previously clarified solution. The composition of this precipitate is variable but may contain substantial amounts of iron and aluminum hydrate, and also calcium carbonate and calcium sulfates. The presence of such precipitate is extremely deleterious to the subsequent filtration and precipitation of the solution with zinc dust. The filtration rate is rapidly retarded, necessitating frequent stoppage of operations for cleaning the filters, the consumption of zinc dust is materially increased and the subsequent melting of the gold-silver precipitate is made more difficult, with higher cost for fluxes, fuel and labor. In the present invention, by immediately and continually deaerating and precipitating the clarified solution, without exposure to the atmosphere, we completely eliminate the formation of this deleterious precipitate.

Efficient precipitation of metals, as for instance gold and silver from cyanide solutions with metallic zinc, requires a preliminary step, namely the substantially complete removal of dissolved oxygen. This may be effected in closed receivers or towers, within which the solution, in thin films or small streams, is subjected to a pressure below atmospheric created by a vacuum pump connected to the top of the receiver. To effectively operate such a receiver a certain amount of solution must be maintained at the bottom of the vessel to seal the outlet, and at the same time the level of this solution must not be allowed to rise above a certain point, as otherwise the effective deaerating volume of the receiver is reduced. Heretofore the solution level control has been generally effected by a float within the receiver, the float in turn operating a control valve on the solution inlet to the receiver. Such control means is expensive and sometimes fails in operation. We have found that by positioning the pump, which withdraws solution from the receiver, so that the suction inlet to the pump housing is at the solution level desired to be maintained within the receiver, the reduced pressure created by the vacuum pump balances the reduced pressure created by the suction of the solution pump, with the result that the solution level within the receiver is maintained at the optimum constant level, without recourse to floats, valves or similar extraneous controls. We thus effect a saving in first cost of equipment and at the same time effect a certainty of regulation not obtainable with floats or like mechanical means.

In practicing the precipitation of cyanide solutions with zinc dust, it is customary to use barren or precipitated cyanide solutions to effect the emulsification of the zinc dust prior to introducing the mixture into the solution to be precipitated. A suitable zinc dust feeder is employed to accurately and uniformly supply the precipitant to the emulsifying cone and it is desirable to use a minimum of barren solution for emulsification, since any excess of barren solution reintroduced into the circuit at this point necessitates a correspondingly larger filter for effecting the final separation of the precipitate from the solution. Any returned barren solution may also, under certain conditions, reintroduce some oxygen into the precipitation circuit, with consequent deleterious results. Obviously this danger will diminish as the volume of the returned barren solution is diminished. In former practice it has been customary to use a minimum of from 5 to 10 gallons per minute of solution to effect the emulsification of the zinc dust even in small plants where the actual tonnage of solution precipitated may not exceed that figure. We have perfected a feeding and emulsifying device which operates satisfactorily with not more than one gallon of solution per minute and with minimum reabsorption of oxygen into the solution.

Referring to the apparatus illustrated in the drawing, tank 10 is for the storage of the cyanide solution to be treated, which is unclarified, undeaerated, and unprecipitated. The solution within this tank is preferably kept at a constant level by the supply pipe 11, which in turn is shown controlled by the float valve 12. Immersed in the solution within tank 10, are suitable filter means 13, which communicate with a discharge pipe 14, and which can consist of suitable vaccum filter elements. Discharge pipe 14 from the filter elements connects with the top of a suitable deaerating receiver 15. The rate of flow of solution thru pipe 14 can be controlled by suitable means such as a manually operated valve 16. In order to maintain a vacuum within receiver 15, we have shown this receiver connected by a pipe 17, to a suitable vacuum pump 18. Pipe 17 is shown carried upward a sufficient height above the receiver 15, to prevent solution from being drawn over into the vacuum pump, and is provided with a vent pipe controlled by valve 19. A splash plate 21 is shown within receiver 15, to cause the inflowing solution to be distributed over a series of screens 22, by which the solution is broken up into thin films. The dissolved gases within the solution, such as oxygen, are removed by the effect of reduced pressure, the liberated gases being withdrawn by the vacuum pump 18 and exhausted to the atmosphere.

Solution is withdrawn from the bottom of receiver 15, thru the pipe 23, this pipe being connected to the inlet of a suitable motor driven pump 24. Pipe 23 is shown provided with a manually operated control valve 26, the purpose of which will be presently explained. To prevent ingress of air into the pump 24, the stuffing box surrounding its operating shaft is preferably immersed in a bath of liquid, which may be the barren cyanide solution from tank 54. To form such a bath we have shown the pump 24 disposed within a receptacle 27, into which barren solution can be introduced from tank 54 by pipe 28. A suitable float controlled valve 29 associated with pipe 28, can maintain the level of liquid within receptacle 27 at the necessary height to submerge the stuffing box.

To form suitable means for introducing zinc dust into the cyanide solution being treated, we have shown a hopper 31, which is preferably conical shaped, and which has its lower end connected to the pump suction line 23, by branch pipe 32. The lower end of hopper 31 is provided with a constricted outlet 33 (Fig. 2). Within the hopper 31, there is a rod 34, the lower end of which extends downwardly through the outlet 33. Fixed to the rod 34, there is a valve member 35, which can be formed of suitable material such as soft vulcanized rubber, and which is adapted to seat upon the outlet 33. Thus when rod 34 is reciprocated, member 35 forms a valve for controlling flow of solution from the hopper.

To provide a simple but accurate means for feeding zinc dust to the hopper 31 at a predetermined regulated rate, we have shown a rotatable cylinder or drum 36. To support and rotate this drum, we provide a pair of parallel shafts 37, carrying flanged rollers 38. Drum 36 rests upon rollers 38, and flanges 39 engage the flanges upon the rollers to prevent longitudinal displacement. Shafts 37 can be connected to be driven in unison, as by a chain 41 and sprockets 42, and one shaft can be driven at a constant rate from a convenient source of power, thru pulley 43. Zinc dust can be introduced into drum 36 by removing closure plug 44, and the interior of the drum contains a number of balls 46. That portion of the drum which overlies hopper 31 is provided with a row of holes 47 of predetermined size. One or more of these holes may be closed by adjusting the position of a sliding gate 48.

The zinc dust feeder just described operates as follows:—Assuming that the drum contains an adequate charge of zinc dust, rotation of the drum at a relatively slow constant rate, causes intermittent discharge of predetermined uniform quantities of zinc dust from each of the exposed openings 47. Therefore by adjusting the setting of gate 48, the rate of feed can be adjusted to the value desired. The steel balls not only insure discharge of the zinc dust in accurately regulated quantities for each revolution of the drum, but also effect a scouring action upon the zinc dust, which is known to have a beneficial action in that it tends to remove any surface film of oxide upon the surfaces of the zinc particles.

In order to reciprocate rod 34, we can dispense with more complicated mechanism by providing a lug 49 upon one end of drum 36. This lug is adapted to engage a tappet 51 which is adjustably secured to rod 34. Therefore for each revolution of drum 36 rod 34 is raised and then permitted to drop by gravity. Therefore the reciprocation of rod 34 will be in synchronism with the periodic introduction of zinc dust into hopper 34. Engagement of lug 34 with tappet 51 also causes repeated rotational movement to be imparted to rod 34.

Hopper 31 is also connected, by means of pipe 53, with a tank 54. Suitable pressure filter elements 56, as for example elements of the bag type, are positioned within tank 54, and these elements are connected by pipe 57 to the discharge side of pump 24. The barren effluent within tank 54 is permitted to flow thru a measuring wier 58, to the discharge pipe 59. The top of hopper 31 is at substantially the same level as the top of tank 54, so that the barren solution will at all times stand at substantially the same height in both receptacles. Likewise the inlet and outlet ends of pipe 53 are both lower than the bottom of measuring wier 58 so that ingress of air into the pipe 53, is prevented.

Operation of the apparatus and process is as follows:—Assuming that supply tank 10 is filled with solution to be clarified, deaerated and precipitated, valve 26 is closed and the vacuum pump 18 is started. Valve 16 is now opened and reduced pressure or partial vacuum in the receiver 15 causes the solution to be drawn thru the vacuum filter elements 13, thru the pipe 14 and into the top of receiver 15, where the incoming solution strikes the splash plate 21 and passes downwardly over the screens 22, to accumulate in the bottom of the receiver. When sufficient solution has entered the receiver 15, vacuum pump 18 is stopped and valve 19 opened to allow atmospheric pressure to enter the receiver 15. Valve 26 is then opened and solution from receiver 15 will then flow by gravity thru the pipes 23 and 32, into hopper 31 and then thru pipe 53 into tank 54. Solution will also fill and prime the pump 24.

Valves 26 and 19 are again closed and vacuum pump 18 again started in operation. When sufficient solution has again been drawn into receiver 15, valve 26 is again opened and pump 24 started in operation. Pump 24 and its connected pipe lines having been previously filled with solution are primed, and a continuous flow of solution thru the apparatus will result. It is to be understood that the above described priming of the pump and pipe line is only necessary for initial operation of the apparatus; at all other times the pump and pipe lines are filled with solution from previous operation of the apparatus.

Assuming now that the valves 16 and 26 are open, that the drum 36 is being driven at a proper rate and that solution is continuously passing thru the apparatus, the following results are effected:—The amount of solution passing thru the apparatus is observed at the measuring wier 58, which may conveniently be graduated, and the flow is regulated by manipulation of the valve 16. The size of this valve is such that even when wide open its capacity is less than the capacity of the pump 24 and the vacuum filter elements 13, and the pressure filter elements 56 are of excess capacity so that no appreciable resistance is offered to the passage of the desired solution flow. The operation of the float supply valve 12 maintains the solution in tank 10 at a constant level so that filter elements 13 are at all times covered by solution. In passing thru the filter elements all suspended solids are removed from the solution, which immediately and without exposure to the atmosphere passes into receiver 15 where dissolved gases, such as oxygen, are liberated from the solution and withdrawn from the receiver by vacuum pump 18. This pump maintains a substantially constant degree of vacuum. It is highly desirable to prevent any of the liberated oxygen from passing into the outlet pipe 23 of the receiver 15. We have found that a depth of about 2 feet of accumulated solution at the bottom of the receiver is sufficient to seal the outlet and by positioning the pump 24 so that the suction inlet in its housing is approximately two feet above the bottom of the receiver, we are enabled to automatically maintain this level as indicated at 51. The pump 24 cannot materially lower level 51, and this level cannot rise to a substantial extent because an equilibrium is automatically maintained between the effective fluid head at the outlet from receiver 15, and the suction of the pump 24. This equilibrium is not materially disturbed by introduction of emulsion thru pipe 32, because outlet 33 is opened only for very short and regular intervals.

As the clarified, deaerated solution passes thru pipe 23, pump 24 and pipe 57 into the pressure filter elements 56, regulated amounts of zinc emulsion are introduced by way of pipe 32, due to the intermittent opening and closing of the valve member 35. By adjusting the lift of the tappet 51, varying amounts of solution may be caused to pass the valve member 35. Continual intermittent rotation of rod 34, thru the action of cam 49 upon tappet 51, together with the lifting and dropping of valve member 35, serves to keep the valve seat clean and tight. Likewise since the lower end of rod 34 projects thru the restricted outlet 33, the motion of the rod serves to effectively keep clear the small annular clearance between the rod and outlet 33. The barren solution in hopper 31 is replenished and kept at the same level as the solution in tank 54, and no appreciable amount of oxygen is reabsorbed by the solution, since the surface of the solution in hopper 31 and in tank 54, is quiescent under which conditions cyanide solution reabsorbs air or oxygen very slowly. Zinc dust dropping from drum 36 sinks quietly into the solution in hopper 31, without appreciably disturbing the surface, and passes thence, thru pipe 32 into pump 24 and pipe 57 to the pressure filter elements 56, where the excess of zinc dust together with the precipitated metals are collected. The precipitated or barren solution overflows the measuring wier 58 and is discharged thru pipe 59, and the combined precipitates are removed periodically from the filter elements 56 for subsequent melting and refining.

We claim:

1. In apparatus of the character described, vacuum filter means for clarifying cyanide solution, deaerating means having a direct flow connection with the clarifying means, a pump having a direct flow connection between its inflow side and the deaerating means, a precipitating filter having a direct flow connection with the discharge side of the pump, and means for admitting a precipitant into the clarified and deaerated solution.

2. In apparatus of the character described, a hopper having a lower restricted discharge outlet communicating with a flowing cyanide solution, a rod extending thru said outlet, means for repeatedly reciprocating and rotating said rod, a valve member secured to said rod and adapted to effect opening and closing of said outlet, and means for supplying liquid and zinc dust to said hopper whereby the liquid together with the zinc dust mixed therewith is supplied through said outlet to said cyanide solution.

3. In apparatus of the character described for the precipitation of gold or silver bearing cyanide solution, a zinc dust feeder comprising a drum adapted to contain a charge of zinc dust, means for rotating said drum at a constant rate, a plurality of balls loosely disposed within the drum, and an opening disposed in one side wall portion of the drum thru which measured masses of zinc dust are periodically discharged.

4. In apparatus of the character described for the precipitation of gold or silver bearing cyanide solution, a zinc dust feeder comprising a drum adapted to contain a charge of zinc dust, means for rotating said drum at a constant rate, a plurality of balls loosely disposed within the drum, a plurality of openings disposed in a side wall portion of the drum, and means for selectively closing one or more of said openings.

5. In a process for the treatment of cyanide solution characterized by the use of a chamber for the deaeration of the cyanide solution and also by the use of a pump for drawing solution from the chamber, the step of maintaining a head of solution above the outlet from the chamber by maintaining an equilibrium between the suction of the pump and the effective fluid head at said outlet.

6. In apparatus of the character described, vacuum filter means for clarifying cyanide solution, deaerating means adapted to receive clarified solutions from said filter means, means arranged to receive the solution from the deaerating means and to effect precipitation of metal therefrom, and a sealed pump serving to conduct the solution thru all of said means in succession without substantial rest or reabsorption of oxygen.

7. In a process for the treatment of alkaline cyanide solution characterized by the use of vacuum clarifying means, deaerating means, and filter means within which metal is precipitated from the solution; the improvement consisting of causing the solution to flow continuously and without substantial rest and without substantial reabsorption of oxygen, from the clarifying means, thru the deaerating means and to the filter means, thereby inhibiting formation of a deleterious precipitate which would otherwise tend to clog the filter means.

8. In a process for the treatment of cyanide solution characterized by the use of filter means within which the solution is precipitated and a precipitant receiving hopper communicating with the flow line to the filter means; said process comprising causing a gravity flow of barren solution from the filter means to said hopper, maintaining a head of barren solution in said hopper substantially equal to the gravity head within the filter means, feeding a precipitant to the barren solution within the hopper, and periodically admitting material from said hopper to said flow line at a rate determined independently of the rate of flow of barren solution to the hopper.

9. In apparatus of the character described, vacuum filter means serving to clarify cyanide solution, deaerating means including a receiver, said receiver having a liquid connection with said vacuum filter means, means for exhausting gases from the receiver and for maintaining a partial vacuum therein, pressure filter means within which the solution is precipitated, a pump having its inlet connected to the lower portion of the receiver and having its discharge side connected to the pressure filter, a hopper adapted to receive a precipitant, a gravity flow connection between the pressure filter means and the hopper whereby a head of barren solution is maintained within the hopper substantially equal to the head of liquid within the pressure filter means, a connection between the lower portion of the hopper and the inflow side of said pump, and means for periodically opening and closing said connection.

10. In a process for the treatment of alkaline cyanide solution which comprises clarifying the solution, immediately thereafter subjecting said solution to the steps of; removing the air from said solution, adding a precipitant to said solution and introducing said solution to a filtering zone where the metal contained in the solution is precipitated and filtered from the solution before the formation of deleterious precipitates.

11. In a process for the treatment of alkaline cyanide solution which includes clarifying the solution in a clarifying zone, deaerating the solution in a deaerating zone and precipitating metal from the solution in a filter zone; the improvement comprising causing the solution to flow continuously and without substantial rest from the clarifying zone to the filter zone, and filtering the precipitated metal from said solution before the formation of deleterious precipitates.

12. In a process for the treatment of alkaline cyanide solution including the steps of clarifying the solution, deaerating the solution and adding a precipitant for the metal contained in said solution, the improvement which comprises deaerating, adding the precipitant and filtering precipitated metal from said solution immediately after clarifying and before the formation of other deleterious precipitates.

LOUIS D. MILLS.
THOMAS B. CROWE.
LUTHER W. LENNOX.